(12) United States Patent
Kannan et al.

(10) Patent No.: US 8,788,498 B2
(45) Date of Patent: Jul. 22, 2014

(54) LABELING DATA SAMPLES USING OBJECTIVE QUESTIONS

(75) Inventors: Anitha Kannan, Mountain View, CA (US); Krishnaram Kenthapadi, Mountain View, CA (US); John C. Shafer, Los Altos, CA (US); Ariel Fuxman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 12/484,255

(22) Filed: Jun. 15, 2009

(65) Prior Publication Data
US 2010/0318539 A1 Dec. 16, 2010

(51) Int. Cl.
*G06F 17/30* (2006.01)

(52) U.S. Cl.
USPC ............... 707/737; 707/740; 707/E17.046; 707/E17.089

(58) Field of Classification Search
USPC ............... 707/999.005, 737, 740, 999.007, 707/E17.046, E17.089
See application file for complete search history.

(56) References Cited

U.S. PATENT DOCUMENTS

| | | | | |
|---|---|---|---|---|
| 5,574,828 A * | 11/1996 | Hayward et al. | | 706/45 |
| 5,680,509 A | 10/1997 | Gopalakrishnan et al. | | |
| 5,764,923 A * | 6/1998 | Tallman et al. | | 705/3 |
| 6,298,351 B1 | 10/2001 | Castelli et al. | | |
| 6,409,599 B1 * | 6/2002 | Sprout et al. | | 463/31 |
| 6,434,549 B1 * | 8/2002 | Linetsky et al. | | 707/719 |
| 6,692,436 B1 * | 2/2004 | Bluth et al. | | 600/300 |
| 6,697,998 B1 | 2/2004 | Damerau et al. | | |
| 7,155,421 B1 * | 12/2006 | Haldar | | 706/46 |
| 7,200,852 B1 * | 4/2007 | Block | | 725/28 |
| 7,603,330 B2 * | 10/2009 | Gupta et al. | | 706/20 |
| 7,831,537 B2 * | 11/2010 | Grabarnik et al. | | 706/52 |
| 8,005,531 B2 * | 8/2011 | Xue et al. | | 600/509 |
| 8,156,065 B1 * | 4/2012 | Larios et al. | | 706/47 |
| 8,375,020 B1 * | 2/2013 | Rogers et al. | | 707/708 |
| 8,380,696 B1 * | 2/2013 | Rogers et al. | | 707/708 |
| 8,560,948 B2 * | 10/2013 | Hu | | 715/705 |
| 2002/0062226 A1 * | 5/2002 | Ito et al. | | 705/2 |
| 2003/0182163 A1 * | 9/2003 | Tice et al. | | 705/3 |
| 2004/0024634 A1 * | 2/2004 | Carp et al. | | 705/10 |
| 2004/0024769 A1 | 2/2004 | Forman et al. | | |
| 2004/0111353 A1 * | 6/2004 | Ellis et al. | | 705/36 |
| 2004/0204981 A1 * | 10/2004 | Schuebel et al. | | 705/10 |
| 2004/0210438 A1 * | 10/2004 | Gillick et al. | | 704/254 |
| 2005/0038647 A1 * | 2/2005 | Baker | | 704/231 |

(Continued)

OTHER PUBLICATIONS

Black et al., "Decision Tree Models Applied to the Labeling of Text with Parts-of-Speech", In Darpa Workshop on Speech and Natural Language, 1992, pp. 117-121.*

(Continued)

*Primary Examiner* — Phuong Thao Cao
(74) *Attorney, Agent, or Firm* — Micah Goldsmith; Glen Johnson; Micky Minhas (57) ABSTRACT

Described is a technology for obtaining labeled sample data. Labeling guidelines are converted into binary yes/no questions regarding data samples. The questions and data samples are provided to judges who then answer the questions for each sample. The answers are input to a label assignment algorithm that associates a label with each sample based upon the answers. If the guidelines are modified and previous answers to the binary questions are maintained, at least some of the previous answers may be used in re-labeling the samples in view of the modification.

20 Claims, 3 Drawing Sheets

(56) References Cited

U.S. PATENT DOCUMENTS

| | | |
|---|---|---|
| 2005/0089246 A1 | 4/2005 | Luo |
| 2006/0078867 A1* | 4/2006 | Penny et al. .................. 434/353 |
| 2006/0111986 A1* | 5/2006 | Yorke et al. ..................... 705/26 |
| 2006/0198502 A1* | 9/2006 | Griebat ...................... 379/88.18 |
| 2006/0289651 A1* | 12/2006 | Gostling ...................... 235/454 |
| 2006/0292539 A1* | 12/2006 | Jung et al. .................... 434/322 |
| 2007/0026372 A1* | 2/2007 | Huelsbergen ................. 434/322 |
| 2007/0067295 A1* | 3/2007 | Parulski et al. .................... 707/7 |
| 2007/0078668 A1* | 4/2007 | Pathria et al. ...................... 705/1 |
| 2007/0083403 A1* | 4/2007 | Baldwin et al. ................... 705/7 |
| 2007/0136457 A1* | 6/2007 | Dai et al. ...................... 709/224 |
| 2007/0156559 A1* | 7/2007 | Wolzenski et al. ............. 705/35 |
| 2007/0166674 A1* | 7/2007 | Kochunni et al. ............. 434/236 |
| 2007/0166689 A1* | 7/2007 | Huang et al. .................. 434/365 |
| 2007/0192166 A1* | 8/2007 | Van Luchene ................. 705/10 |
| 2007/0219996 A1* | 9/2007 | Jarvinen ............................ 707/7 |
| 2008/0021851 A1* | 1/2008 | Alcalde et al. ................. 706/21 |
| 2008/0027790 A1* | 1/2008 | Balz et al. ....................... 705/11 |
| 2008/0065995 A1* | 3/2008 | Bell et al. ...................... 715/751 |
| 2008/0082013 A1* | 4/2008 | Xue et al. ...................... 600/509 |
| 2008/0177704 A1* | 7/2008 | Denney et al. .................... 707/3 |
| 2009/0006269 A1* | 1/2009 | Klayman .................... 705/36 R |
| 2009/0012838 A1* | 1/2009 | DeJong et al. ................. 705/10 |
| 2009/0030856 A1* | 1/2009 | Arena et al. ................... 706/11 |
| 2009/0064028 A1* | 3/2009 | Garvey et al. ................ 715/781 |
| 2009/0070152 A1* | 3/2009 | Sperske et al. ................... 705/4 |
| 2009/0070160 A1* | 3/2009 | Kasravi et al. ................... 705/7 |
| 2009/0100371 A1* | 4/2009 | Hu ................................ 715/780 |
| 2009/0106233 A1* | 4/2009 | Veenstra ........................... 707/5 |
| 2009/0143905 A1* | 6/2009 | Blust et al. .................... 700/241 |
| 2009/0150387 A1* | 6/2009 | Marchewitz ...................... 707/5 |
| 2009/0254421 A1* | 10/2009 | Wolfe ............................. 705/10 |
| 2009/0276706 A1* | 11/2009 | Lukes ........................... 715/708 |
| 2009/0287514 A1* | 11/2009 | West ................................. 705/7 |
| 2010/0023346 A1* | 1/2010 | Paty et al. ......................... 705/2 |
| 2010/0042409 A1* | 2/2010 | Hutchinson et al. .......... 704/235 |
| 2010/0047754 A1* | 2/2010 | Metz et al. .................... 434/322 |
| 2010/0056239 A1* | 3/2010 | Inubushi et al. .................. 463/9 |
| 2010/0082603 A1* | 4/2010 | Krompass et al. ............ 707/719 |
| 2010/0198630 A1* | 8/2010 | Page et al. ......................... 705/7 |
| 2010/0309971 A1* | 12/2010 | Vanman et al. .......... 375/240.01 |

OTHER PUBLICATIONS

Gowtham Bellala, "Generalized Binary Search Trees and Clock Tree Revisited", In the Proceedings of American Medical Informatics Association, 2007, 9 pages.*

Document "Decision Trees", 28 pages, accessed online at <http://www.cse.msu.edu/~cse802/DecisionTrees.pdf> on Mar. 21, 2014.*

Hoshino, et al., "WebExperimenter for Multiple-Choice Question Generation", Retrieved at <<http://www.r.dl.itc.u-tokyo.ac.jp/~nakagawa/academic-res/hoshino-HLT.pdf>>, Proceedings of HLT/EMNLP on Interactive Demonstrations, Oct. 7-7, 2005, pp. 2.

Vega, et al., "Continuous Naive Bayesian Classification", Retrieved at <<https://dl.comp.nus.edu.sg/dspace/bitstream/1900.100/1429/1/report.pdf>>, Technical Report, TRB6/03, Department of Computer Science, National University of Singapore, Jun. 2003, pp. 10.

Kim, et al., "Automatic Identification of Pro and Con Reasons in Online Reviews", Retrieved at <<http://www.isi.edu/natural-language/people/hovy/papers/06ACL-ProCon-opinions-short.pdf>>, Proceedings of the COLING/ACL on Main conference poster sessions, Jul. 17-18, 2006, pp. 8.

* cited by examiner

LABELING DATA SAMPLES USING OBJECTIVE QUESTIONS

BACKGROUND

There are many applications such as relevance ranking, identification of intent, image classification and handwriting classification that employ machine learning techniques over manually labeled data. In such applications that use supervised learning techniques, a first step is to obtain manually labeled data. For this, human judges are provided with guidelines as to how to label a set of items (these items can be documents, images, queries and so forth, depending on the application).

These guidelines can be anywhere from a few sentences to tens of pages. While detailed guidelines serve to clarify the labeling criteria, in practice, it is often not possible for human judges to assimilate and apply all the guidelines consistently and correctly. The difficulty increases as the guidelines get longer and more complex. Further, most judges need to label a large number of items within a short span of time.

This results in noisy labels, which hinders the performance of the machine learning techniques and directly impacts the businesses that depend on these techniques. It also limits any ability to evaluate and compare against the competition, as these labels are also used during evaluation time.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which objective (e.g., binary yes/no) questions are developed (e.g., by experts) and provided to judges for evaluating against data samples to obtain answers. The answers are input to a label assignment mechanism (algorithm) that determines a label for the data sample based upon the answers. The label is then associated with the data sample.

In one aspect, the questions may be arranged in a tree-like structure in which the answer to a question determines whether to ask a subsequent question, or determines which branch to take to ask a subsequent question. The label assignment algorithm may be constructed by performing a depth-first traversal of the tree-like structure.

In one aspect, the objective questions may be based upon a set of guidelines. If the guidelines are modified and previous answers to the binary questions are maintained, at least some of the previous answers may be used in re-labeling the samples in view of the modification. For example, questions may be added, deleted and/or changed; the other answers may remain valid. Also, if the guidelines result in a label change, the label assignment algorithm may be re-run with the new label change on the previous answers to re-label the samples.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards removing the need for the judges to work with guidelines, by asking a series of questions with more definite answers. For example, the questions may be framed such that answers are binary, either true or false. At the same time, the questions are generally designed in such a way that they require no intrinsic or new knowledge, instead requiring only common sense. Once the answers are obtained, an automated procedure uses these answers to infer the labels.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in sample labeling and data processing in general.

Figure 1:
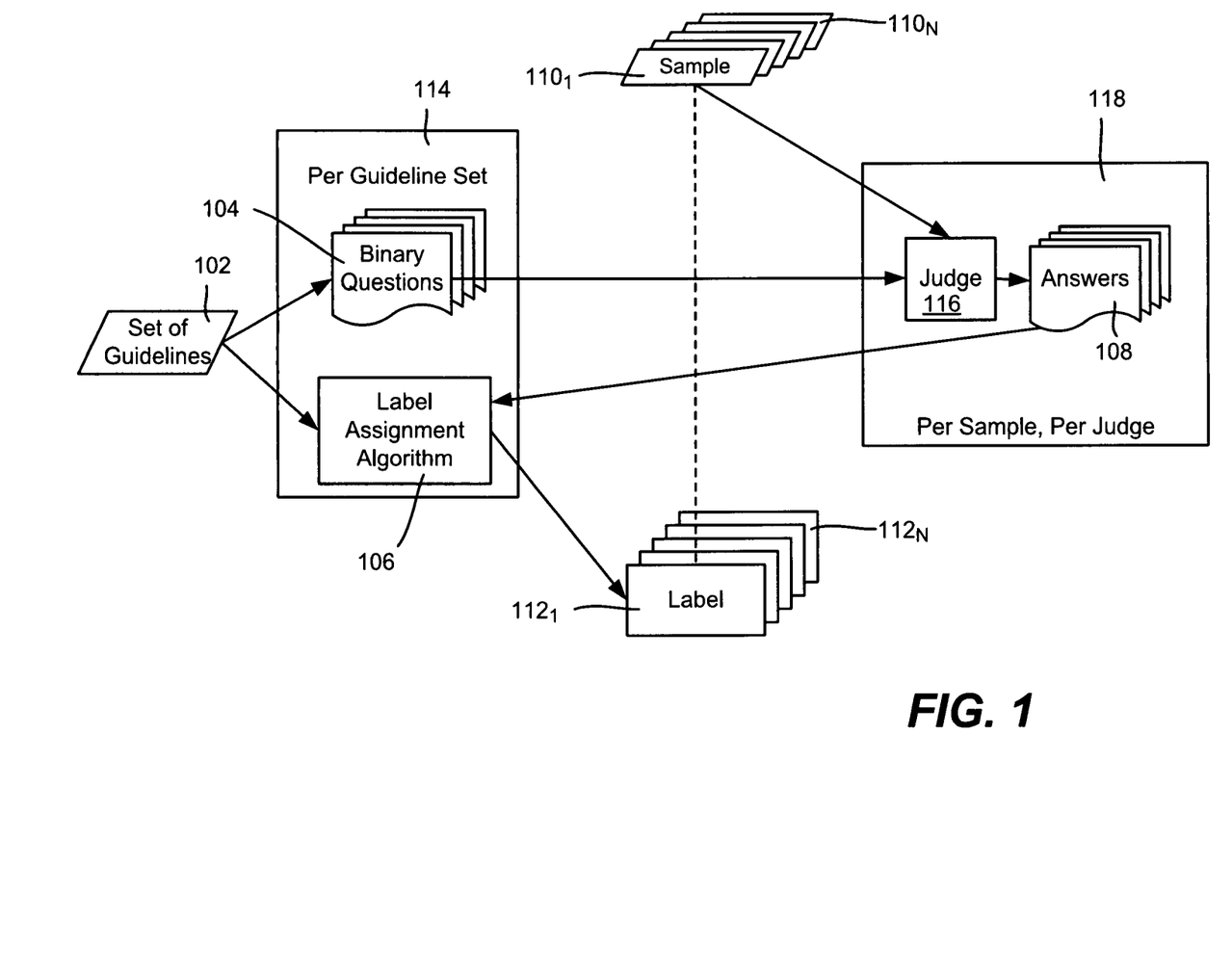
FIG. 1 is a block diagram representing example components for using objective questions presented to a human to label data samples based on the answers to those questions.

FIG. 1 shows a block diagram in which a set of guidelines 102 for labeling data are converted to binary (yes/no) questions 104, typically by experts. Note that while binary questions are exemplified, other simple objective questions that have definite answers may be used, e.g., it is feasible to have simple multiple choice questions, e.g., is a document written a) in English, b) in Chinese or c) another language. Note that this is equivalent to combining binary questions (is the document in English? if no, is the document in Chinese?). Thus, as used herein, the term "question" refers to any objective question having an answer that is typically unambiguous and not subject to substantial interpretation by a judge, with a lesser number of choices being generally desirable.

Thus, once the set of guidelines 102 for labeling are decided, the guidelines are converted into the set of binary questions 104. This conversion is typically performed by manual operations, although some assistance from automated technology may be used, such as to merge candidate questions from a number of experts into a final set.

In addition, the questions 104 are considered in conjunction with the guidelines to produce a label assignment algorithm 106. In general and as exemplified below, the label assignment algorithm 106 evaluates the yes/no (or other) answers 108 for the questions 104 with respect to each sample of data (sample $110_1$-$110_N$) to be labeled to come up with a label $112_1$-$112_N$ for each. Note that the mapping of the set of guidelines 102 to the questions 104 and to the label assignment algorithm 106 is done once for a given guideline, (as represented in FIG. 1 by the "per guideline set" block labeled 114).

For every sample $110_1$-$110_N$ to be labeled, each judge 116 of a set of one or more judges is asked to answer these binary questions 104, providing the set of answers 108 from each judge. In other words, the answers 108 are obtained per sample and per judge, as represented in FIG. 1 by the "per sample, per judge" block labeled 118.

For each judged sample $110_1$-$110_N$, the label assignment algorithm 106 assigns a label $112_1$-$112_N$ based upon the various answers 108 for that sample/judge in an automated post processing step. A composite label for each sample may be obtained by combining the separate labels from the judges, e.g., by using majority voting. Note that in theory, with a proper question set and correct answers, the label assigned by the algorithm will be the same as one provided by a judge that directly used and correctly applied the guidelines.

By way of example, consider a first scenario in which human labels are required to train a machine learning algorithm, such as to label whether a query has commercial intent. This first scenario is concerned with the articulation of guidelines to enable identification of a dominant label for items that can be ambiguously labeled. For this task, the judges will be asked questions that identify whether a given query reflects the intention (for majority of users) to buy a tangible product, so that commerce-related content can be shown to such users.

To infer whether a query posed to a search engine has commercial intent, large amounts of training data labeled as commercial or noncommercial are typically needed, because of large variations in the search queries. The labeling task is inherently very difficult, and indeed, it is not possible to precisely specify which queries have commercial intent because the same query can have multiple interpretations. For example, consider the query 'digital camera'. If the user intent is to buy a digital camera, then this query has commercial intent; however, when the intent is to find the history of digital cameras, then the same query has noncommercial intent.

In general, a query has a commercial intent if most of the users who submit the query have the intention to buy a tangible product. Examples of tangible products include items such as books, furniture, clothing, jewelry, household goods, vehicles, and so forth; services are not considered to be tangible products. For example, "medical insurance" and "cleaning services" are queries that are not considered commercial in this particular scenario. However commercial intent includes queries in which a user submits when researching the product before buying it, e.g., "digital camera reviews" and "digital camera price comparison" reflect an intention to buy. Intention to buy also means that money will be spent on the product, and thus excludes products that can be obtained for free. For example, a "free ringtones" query does not have commercial intent.

Binary questions corresponding to such a set of guidelines may be used to explicitly force the judges to think of certain situations, namely one where the user may intend to buy a tangible product, and another where the user may not have such intent. The judges thus compare the two situations, and choose the one believed to be more frequent. For example, the following questions may be asked:

Question 1: Can you think of a likely situation where the user may be typing the query with the intention to buy a tangible product?

Question 2: Can you think of a likely situation where the user may be typing the query without the intent to buy a tangible product?

Note that question 2 may be answered either way, even if the answer to Question 1 is Yes. For example, consider the query "chocolates". The correct answer to Question 1 is "Yes" because a person may be planning to buy chocolates for a gift. The correct answer to Question 2 is also "Yes" because a person may be trying to learn about different types of chocolates, rather than buying chocolates.

Thus a third question (which may be asked contingent only upon both answers being "Yes") may be posed:

Question 3: We now ask you to compare the situations that you imagined for Questions 1 and 2. In particular, which one do you think applies to more people that use a search engine?

As can be readily appreciated, the third question makes a judge consider whether commercial intent is more likely with respect to a query. For example, if the query is for a brand name of a popular product, then most judges will likely consider the query to have commercial intent.

The label assignment algorithm evaluates the answers. For any given query, the query is considered to be commercial if the answer to Question 1 is positive, and if the answer to Question 3 is that the situation imagined for Question 1 is more likely than the one for Question 2, whenever the answer to Question 2 is positive. The following table provides a concise description of the assignment algorithm that can applied to automatically assign a label that indicates if the query has commercial intent. Note that the approach allows easy identification of bad judges when they have inconsistency, in terms of invalid combinations, that is, there is a "bad-judge" label among the set of possible labels, (although ultimately the sample will not be labeled "bad-judge" if, for example, the majority of labels are "bad-judge" for a particular sample; indeed, such a sample may be discarded or further analyzed). Alternatively, if the bad-judge "label" appears too often among a plurality of judges over a plurality of samples, it is likely that one or more of the questions is causing the judges to be confused.

| Conditions | Label |
| --- | --- |
| Question 1 = Yes & Question 3 = Yes | Commercial |
| Question 2 = Yes & Question 3 = No | Non-Commercial |
| Question 1 = No & Question 2 = No | Bad-Judge |
| Question 1 = No & Question 2 = Yes & Question 3 = Yes | Bad-Judge |
| Question 1 = Yes & Question 2 = No & Question 3 = No | Bad-Judge |

Note that this approach further allows identification of bad or ambiguous questions. To achieve this, a ground truth set may be created, comprising pairs of questions and samples such that there is only one real true answer to that pair. Typically, the creator of the guidelines also produces the ground truth set, and/or the set may be used by a (separate) set of judges. If the majority of the judges' answers are inconsistent with the true answer, this indicates that the question is bad or ambiguous; inconsistencies across multiple judges are thus used to decide if a question is bad or ambiguous.

Turning to another aspect, modifications to the guidelines can be easily incorporated without throwing away the data collected so far. By way of example, consider the revision to the guidelines that exclude queries about vehicles/automobiles from being a commercial query. To this end, another question is added:

Question 4: Is the query about an automobile or vehicle such as cars, boats, etc?

The label assignment algorithm can combine the answers from the previous questions and this question, without re-asking the previous questions, as shown in the following table:

| Conditions | Label |
| --- | --- |
| Question 1 = Yes & Question 3 = Yes & Question 4 = No | Commercial |

-continued

| Conditions | Label |
| --- | --- |
| Question 2 = Yes & Question 3 = No | Non-Commercial |
| Question 1 = No & Question 2 = No | Bad-Judge |
| Question 1 = Yes & Question 3 = Yes & Question 4 = Yes | Non-Commercial |
| Question 1 = No & Question 2 = Yes & Question 3 = Yes | Bad-Judge |
| Question 1 = Yes & Question 2 = No & Question 3 = No | Bad-Judge |

It should be noted that by separately maintaining the answers to the questions, other types of modifications are feasible. Thus, not only may a question (or questions) be added, but a question (or questions) may be deleted or substituted. Only the changed questions need to be asked, with the answers merged with the other remaining answers.

Turning to another example, a second scenario is directed towards meeting multiple conditions for assigning a particular label, exemplified herein as determining the relevance of a document (representative of that product) to a query. Given a commercial query and a product, the labeling goal is to assign a label (such as Perfect, Good, Fair, Bad) indicating the relevance of the product for the query. In order to assign one of these labels, multiple conditions need to be satisfied.

To determine the relevance of a product for a given query (with commercial intent), each judge is shown a <query, product> tuple, that is, a query with commercial intent and a product description page (containing title, description, and image of the product). The goal for the judge is to assign one of the following labels: perfect, good, fair, bad. The training set formed using these labels can be used to learn a ranking model that ranks products given a query. The relevance of the ranking model depends on the quality of the training data, and thus precise labels are needed.

The difficulty of determining the relevance of a product to a query and thereby assigning a label arises because there are many different classes of queries with commercial intent. A query may broadly refer to a product class, e.g., 'digital camera', or may be about a specific product, e.g. '40 GB black zune mp3 player' (note capitalization was intentionally omitted to reflect how users typically input queries).

For a possible set of guidelines the nature of the query is evaluated, i.e., whether the query is specific to a brand, a product, a product class (e.g. video games or digital cameras), or a line of products (e.g. Microsoft Office). Consider when the query is specific to a brand; the label cannot be 'perfect' for any product. If the product shown matches the brand exactly, the label should be 'good'. On the other hand, if the product can be associated with a competing brand, the label should be 'fair'. Otherwise the label should be 'bad'.

Next consider the case in which the query is specific to a product class. If the product belongs to the identical product class, the label should be 'good'. If the product belongs to the similar class (e.g. digital camera versus disposable camera), the label should be 'fair' and otherwise, 'bad'.

Further, consider the case in which the query is specific to a line of products. If the product matches the product line exactly, the label should be 'perfect'. However if the product is of the same brand but not the same product line (e.g. query about 'Microsoft Excel' but the product about 'Microsoft Word'), the label should be 'good'. If the product is an accessory for the product line, the label should be 'fair' and else, 'bad'. Finally consider the case in which the query is specific to a product. If the product shown matches the product of the query exactly, the label should be 'perfect'. If the product shown is somewhat related to the query (e.g. 40 GB zune versus 8 GB zune), the label should be 'good'. If the product shown is about a different brand (e.g. 40 GB zune versus 80 GB generic MP3 player) or an accessory, then the label should be 'fair' and else, 'bad'.

The following table sets forth example binary questions corresponding to the above set of guidelines:

| | |
| --- | --- |
| Q1 | Is the query specific to a brand? |
| Q2 | Is the query specific to a product class? (e.g., video games, digital camera) |
| Q3 | Is the query specific to a product? |
| Q4 | Is the query specific to a line of products? (e.g., Microsoft Zune) |
| Q5 | Does the query shown match the brand exactly? (e.g., Mfr. XYZ vs. Mfr. ABC) |
| Q6 | Would you associate the product with a competitor's brand? |
| Q7 | Does the product belong to the identical product class? |
| Q8 | Does the product below to the similar class? (e.g., digital camera vs. disposable camera) |
| Q9 | Does the product match the product line exactly? |
| Q10 | Is the product of the same brand but not the same product line? (e.g., query about 'Microsoft Zune' but the product about 'Microsoft Office') |
| Q11 | Is the product an accessory for the product line? |
| Q12 | Does the product shown match the product of the query exactly? |
| Q13 | Is the product shown somewhat related to the query? (e.g., 40 GB Zune vs. 8 GB Zune) |
| Q14 | Is the product shown about a different brand or accessory? |

The above guidelines are thus converted into simple questions so that a judge need not comprehend and remember the complex guidelines in their entirety. Instead a set of simple questions can be posed to the judge in an adaptive manner, as represented in the tree diagram of FIG. 2 which shows how these questions may be asked based upon prior answers. A first set of questions pertains to the nature of the query; as the query can be of only one type, remaining questions regarding the type are skipped once a positive response is obtained. A next set of questions focus on how the product relates to the query intent; these questions in turn are adaptive and also depend on the answer or answers previously obtained.

Figure 2:
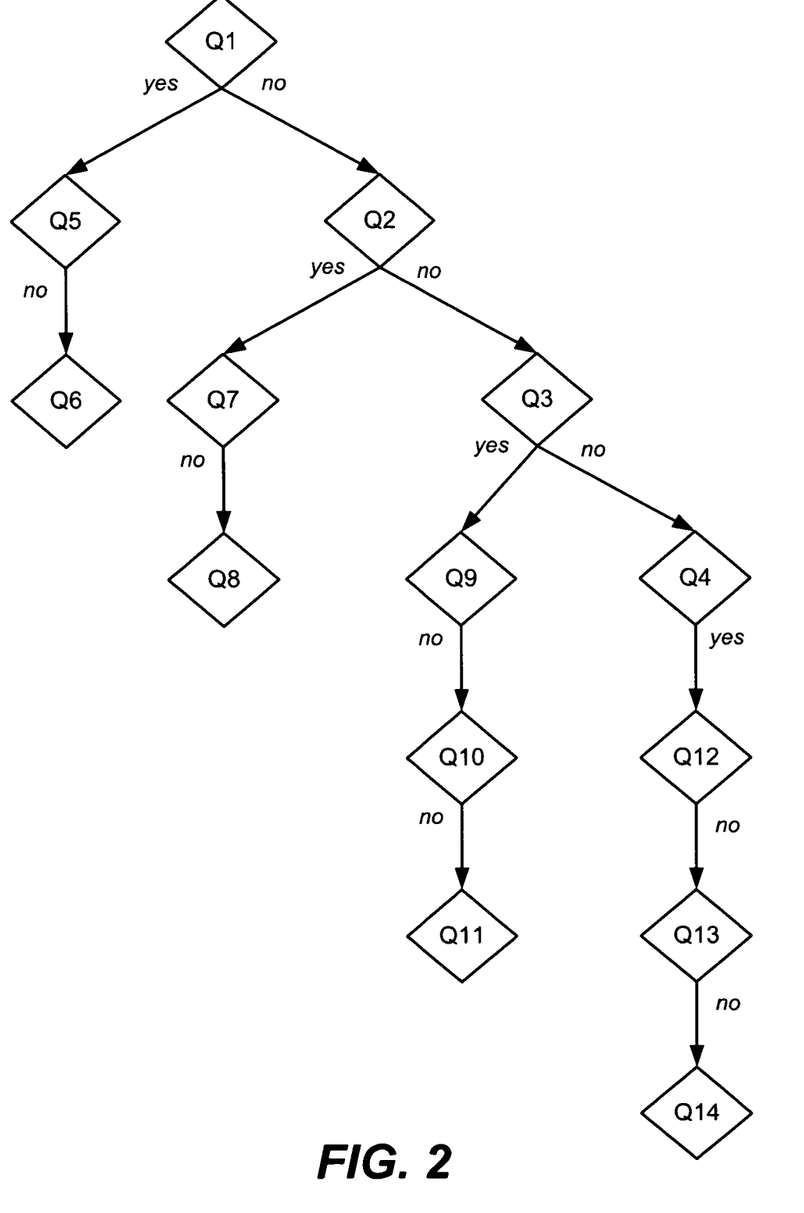
FIG. 2 is representation of a tree structure showing how binary questions may be arranged to obtain answers for labeling data samples.

Thus, as represented in FIG. 2, starting with Question Q1, the judges are asked further questions depending on the answer to the previous question. The maximal number of questions a judge can be asked with respect to a given query is the height of this tree, which is seven.

Based on the guidelines, the following algorithm for assigning the label is produced. The label assignment algorithm takes as input the binary answers provided by the judge (note that the judge need not be aware of the label assignment algorithm). Thus in the process of posing binary questions, reduce the burden on the judge may be further reduced.

| Conditions | Label |
| --- | --- |
| Q1 = yes AND Q5 = yes | Good |
| Q1 = yes AND Q6 = yes | Fair |
| Q2 = yes AND Q7 = yes | Good |
| Q2 = yes AND Q8 = yes | Fair |
| Q3 = yes AND Q9 = yes | Perfect |
| Q3 = yes AND Q10 = yes | Good |
| Q3 = yes AND Q11 = yes | Fair |
| Q4 = yes AND Q11 = yes | Perfect |
| Q4 = yes AND Q13 = yes | Good |
| Q4 = yes AND Q14 = yes | Fair |
| All other combinations | Bad |

As can be seen, the label assignment algorithm traverses the binary questions tree of FIG. 2 in depth-first order for the answers from the judges to these binary questions to obtain the relevance label for the document (product) to the product query. Note that once the binary questions are developed in a tree-like structure, it is straightforward to devise the label assignment algorithm. The tree is traversed in a depth first fashion, and every path ending in a leaf node is mapped to a label from the label set.

The guidelines for determining relevance of a product to a query are likely to be modified over time, and also, better ways of phrasing a question may be developed, (such as if a particular question seems to confuse judges). As in the case of detecting commercial intent, modifications to the guidelines may be made without having to abandon the data collected so far. For example, if a new criterion (e.g. if the age of the product is more than five years, the label should always be 'bad') is to be included, the sequence of binary questions and the label assignment algorithm may be modified without making the previously collected data invalid. Similarly if the outcome of an existing criterion is changed (e.g., if the query is specific to a brand and the product matches the brand exactly, the label should be 'perfect' instead of 'good'), only label assignment algorithm needs to be updated, while making use of the existing data collected.

As can be seen, there is described the conversion of guidelines to questions regarding a data sample, with the answers to those questions processed to infer a label for that sample. This makes it easy to obtain large-scale data sets, as the amount of time a judge needs to spend answering a question is relatively small. Further, the data collected by this approach is less error prone and more consistent since the questions can be easily answered by the judges.

Moreover, when the guidelines change, it is easy to straightforward to re-use some or all of the existing collected data to adjust for the change. This may involve removing some of the earlier questions or asking more or different questions, and then automatically re-computing the label; (note that earlier labeling approaches discard the data when the guidelines change). Also, a label may be changed without needing to collect any new data.

The technology also makes it easy to identify specific criteria that need clarification or are causing confusion amongst the judges, facilitating quick and focused refinements to both the questions and/or to the original guidelines. This can potentially be done without having to completely discard the previously collected data. The technology also allows effective identification of bad judges, because since a judge who consistently performs badly on questions relative to other judges can be quickly identified as being not likely suited for the judgment process.

Exemplary Operating Environment

Figure 3:
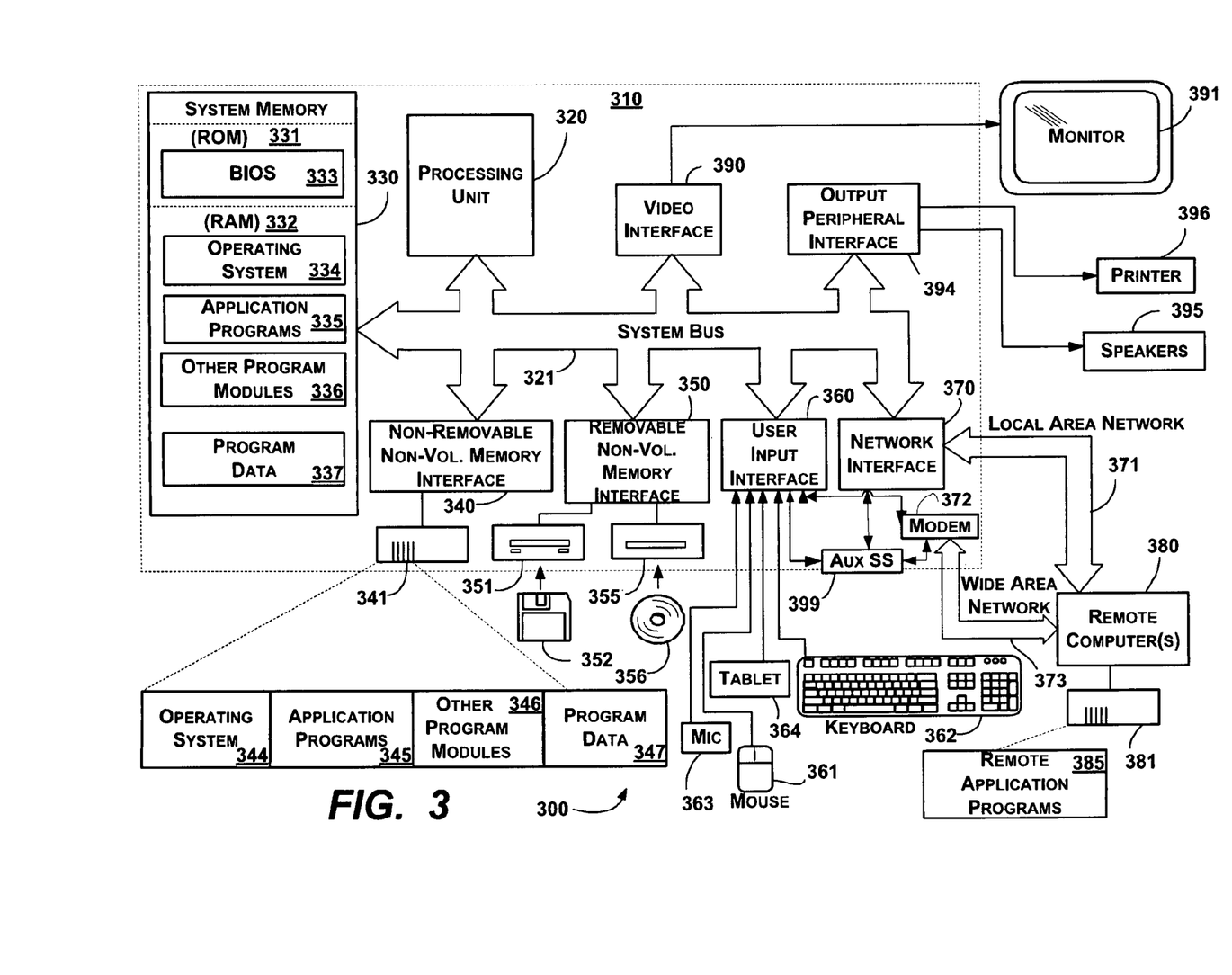
FIG. 3 shows an illustrative example of a computing environment into which various aspects of the present invention may be incorporated.

FIG. 3 illustrates an example of a suitable computing and networking environment 300 into which the examples and implementations of any of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during startup, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
receiving a plurality of sets of answers from human judges to a set of objective questions regarding a data sample;
determining, by one or more processors, a label from each human judge for the data sample based upon a set of answers from each human judge using a label assignment algorithm to provide a set of labels for the data sample, wherein the label assignment algorithm is produced by mapping the set of objective questions to a set of guidelines for labeling;
determining a single label for the data sample using the set of labels; and
associating the single label with the data sample.

2. The method of claim 1 wherein the set of objective questions comprise binary questions, and wherein inputting answers comprises receiving data corresponding to a yes or no answer for each question asked.

3. The method of claim 1 wherein the set of objective questions are arranged in a tree-like structure in which an answer to a question determines whether to ask a subsequent question, or determines which path to take to ask a subsequent question.

4. The method of claim 3 further comprising:
producing the label assignment algorithm that determines the label for the data sample by examining paths of the set of objective questions posed and the set of answers, including traversing the tree-like structure in a depth first fashion, and associating each path ending in a leaf node to a label from a label set.

5. The method of claim 1 further comprising:
producing the set of objective questions based upon a set of guidelines.

6. The method of claim 1 wherein the label and the associated data sample are used to train a machine learning algorithm.

7. The method of claim 1 further comprising:
maintaining the plurality of sets of answers to the set of objective questions as previous answers;
receiving a modification to the set of objective questions; and
reusing at least some of the previous answers for each sample to re-label the data sample based upon the modification to the set of objective questions.

8. The method of claim 7 wherein receiving the modification to the set of objective questions comprises at least one of adding at least one question, changing at least one question, or deleting at least one question.

9. The method of claim 1 further comprising:
at least one of identifying bad questions through inconsistencies across judges, or identifying bad judges through inconsistent answers.

10. The method of claim 1 further comprising:
maintaining the plurality of sets of answers to the set of objective questions as previous answers;
receiving a modification to a set of labels from which the label is selected; and
reusing at least some of the previous answers for the data sample to re-label the data sample based upon the modification to the set of labels.

11. In a computing environment, a system comprising:
a memory;
one or more processors coupled to the memory; and
a label assignment mechanism, implemented on the one or more processors, and configured to assign a label from among a set of labels to a data sample, the label assignment mechanism configured to determine which label to assign to the data sample based upon a path of objective questions and a plurality of sets of answers to the objective questions posed to at least two human judges, wherein for each set of answers the label assignment mechanism is configured to traverse a tree-like structure of the objective questions in a depth first fashion and associate each path ending in a leaf node to one label from among the set of labels to generate a plurality of labels associated with the plurality of sets of answers, and wherein the determining includes identifying a single label for the data sample using the plurality of labels associated with the plurality of sets of answers.

12. The system of claim 11 wherein the data sample corresponds to a search query, and wherein the objective questions result in the data sample being labeled as having commercial intent or not having commercial intent.

13. The system of claim 11 wherein the data sample corresponds to a search query and a document, and wherein the objective questions result in the data sample being labeled with data indicating the document's perceived relevance to the search query.

14. The system of claim 13 wherein the document corresponds to a commercial product.

15. The system of claim 11 wherein the objective questions comprise binary questions.

16. The system of claim 11 wherein the objective questions are based on a set of guidelines, and further comprising:
a mechanism configured to change at least one of the objective questions or change at least one label from the set of labels, or change at least one of the objective question and at least one label from the set of labels, based upon a modification to the set of guidelines.

17. One or more computer storage devices having computer-executable instructions, which in response to execution by a computer, cause the computer to perform steps comprising:
providing samples and a set of binary questions to a plurality of judges;
obtaining sets of answers to the set of binary questions from each of the plurality of judges with respect to each sample;
identifying bad judges through inconsistent answers across the sets of answers; and
using the sets of answers obtained for each sample and a label assignment algorithm to determine which label of a finite set of labels to associate with that sample for each set of answers in the sets of answers to produce a plurality of labels for that sample, wherein the label assignment algorithm is produced by mapping the set of binary questions to a set of guidelines for labeling; and
determining a single label for that sample using the plurality of labels.

18. The one or more computer storage devices of claim 17 wherein using the sets of answers for each sample to determine which label to associate with that sample comprises using the sets of answers from the plurality of judges to determine votes in a voting scheme.

19. The one or more computer storage devices of claim 17 having further computer-executable instructions comprising:
maintaining the sets of answers to the set of binary questions as previous answers;
receiving a modification to the set of binary questions; and
reusing at least some of the previous answers for each sample to re-label the samples based upon the modification to the set of binary questions.

20. The one or more computer storage devices of claim 17 having further computer-executable instructions comprising:
maintaining the sets of answers to the set of binary questions as previous answers;
receiving a modification to the set of labels; and
reusing at least some of the previous answers for each sample to re-label the samples based upon the modification to the set of labels.

* * * * *